(12) United States Patent
Kamiya

(10) Patent No.: US 10,855,930 B2
(45) Date of Patent: Dec. 1, 2020

(54) VIDEO SYSTEM, VIDEO PROCESSING METHOD, PROGRAM, CAMERA SYSTEM, AND VIDEO CONVERTER

(71) Applicant: SONY CORPORATION, Tokyo (JP)

(72) Inventor: Koji Kamiya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/779,922

(22) PCT Filed: Dec. 22, 2016

(86) PCT No.: PCT/JP2016/005210
§ 371 (c)(1),
(2) Date: May 30, 2018

(87) PCT Pub. No.: WO2017/119037
PCT Pub. Date: Jul. 13, 2017

(65) Prior Publication Data
US 2018/0332210 A1 Nov. 15, 2018

(30) Foreign Application Priority Data

Jan. 5, 2016 (JP) ................. 2016-000730

(51) Int. Cl.
*H04N 5/235* (2006.01)
*H04N 21/4402* (2011.01)
(Continued)

(52) U.S. Cl.
CPC .......... *H04N 5/2355* (2013.01); *H04N 1/603* (2013.01); *H04N 1/6058* (2013.01);
(Continued)

(58) Field of Classification Search
CPC .. H04N 5/2355; H04N 5/23232; H04N 5/341; H04N 5/361; H04N 1/603; H04N 1/6058
See application file for complete search history.

(56) References Cited

U.S. PATENT DOCUMENTS

2010/0246940 A1* 9/2010 Lin ................. G06T 5/009
382/159
2014/0210847 A1 7/2014 Knibbeler et al.
(Continued)

FOREIGN PATENT DOCUMENTS

JP 2014-520414 8/2014
JP 2014-532195 A 12/2014
(Continued)

OTHER PUBLICATIONS

International Search Report dated Mar. 14, 2017 in PCT/JP2016/005210, citing documents AO and AP therein, 2 pages.
(Continued)

*Primary Examiner* — Antoinette T Spinks
(74) *Attorney, Agent, or Firm* — Oblon, McClelland, Maier & Neustadt, L.L.P.

(57) ABSTRACT

This video system includes a camera system and a video converter. The camera system includes an image pickup unit that captures a subject and obtains a pixel signal thereof, and a first processing circuit that generates two video signals from the pixel signal while respectively carrying out mutually-different adjustments and transmits transmission information obtained by adding information related to the respective adjustments of the video signals to one of the video signals. The video converter extracts the information related to the respective adjustments of the video signals from the transmission information and includes a second processing circuit that generates, on a basis of these pieces of information related to the adjustments, a restoration pixel signal by inverse-transforming one of the video signals included in the transmission information, and also generates a video signal corresponding to the other one of the video signals by performing an adjustment for the other one of the video signals on this restoration pixel signal.

16 Claims, 5 Drawing Sheets

(51) Int. Cl.
  *H04N 21/234* (2011.01)
  *H04N 5/361* (2011.01)
  *H04N 5/232* (2006.01)
  *H04N 1/60* (2006.01)
  *H04N 5/341* (2011.01)

(52) U.S. Cl.
  CPC ......... *H04N 5/23232* (2013.01); *H04N 5/341* (2013.01); *H04N 5/361* (2013.01); *H04N 21/234* (2013.01); *H04N 21/4402* (2013.01)

(56) References Cited

U.S. PATENT DOCUMENTS

| | | | |
|---|---|---|---|
| 2015/0243200 A1* | 8/2015 | Pan | H04N 19/102 345/590 |
| 2016/0248939 A1 | 8/2016 | Thurston, III et al. | |
| 2017/0337670 A1* | 11/2017 | Guermoud | G06T 5/40 |
| 2018/0253834 A1* | 9/2018 | Pouli | G06T 5/008 |
| 2019/0141229 A1* | 5/2019 | Kamiya | H04N 5/2355 |

FOREIGN PATENT DOCUMENTS

| | | |
|---|---|---|
| WO | WO 2015/007910 A1 | 1/2015 |
| WO | WO 2015/073377 A1 | 5/2015 |
| WO | WO 2015/130793 A1 | 9/2015 |
| WO | WO 2015/198552 A1 | 12/2015 |
| WO | WO-2019147028 A1 * | 8/2019 ............... G06T 5/00 |

OTHER PUBLICATIONS

Extended European Search report dated Oct. 5, 2018 in Patent Application No. 16883543.7, citing document AO therein, 9 pages.

Office Action dated Jul. 23, 2019, in Japanese Patent Application No. 2017-205916 (with English-language translation), references AO-AQ cited therein.

Office Action dated Mar. 10, 2020 in corresponding Japanese Patent Application No. 2017-205916 (with English Translation), citing document AO therein, 7 pages.

* cited by examiner

VIDEO SYSTEM, VIDEO PROCESSING METHOD, PROGRAM, CAMERA SYSTEM, AND VIDEO CONVERTER

TECHNICAL FIELD

The present technology relates to a video system, a video processing method, a program, a camera system, and a video converter for processing a plurality of types of video signals whose levels, colors, and the like have been adjusted under different conditions.

BACKGROUND ART

In HDR (High Dynamic Range) imaging, it is possible to express videos having a wide dynamic range and realize high-luminance expressions and expressions of colors having high luminance, that have been unable to be fully expressed by SDR (Standard Dynamic Range) video signals having a standard dynamic range displayable on a normal monitor.

Patent Literature 1 discloses a method of encoding an HDR video and an LDR video together.

CITATION LIST

Patent Literature

Patent Literature 1: Japanese Patent Application Laid-open No. 2015-506623

DISCLOSURE OF INVENTION

Technical Problem

The present technology aims at solving various problems in a case of processing a plurality of video signals that have been respectively adjusted under mutually-different conditions.

Solution to Problem

For solving the problem described above, a video system according to an embodiment of the present technology includes:
a camera system; and
a video converter,
the camera system including
a first processing circuit that generates, from a pixel signal generated by an image pickup unit that captures a subject and obtains a pixel signal thereof, a first video signal on a basis of a first image adjustment parameter, generates a second video signal on a basis of a second image adjustment parameter different from the first image adjustment parameter, and transmits transmission information obtained by adding the first adjustment parameter and the second adjustment parameter to the second video signal via a first transmission channel,
the video converter receiving the transmission information via the first transmission channel and including
a second processing circuit that generates, on a basis of the second image adjustment parameter included in the transmission information, a restoration pixel signal by inverse-transforming the second video signal included in the transmission information, and also carries out adjustment processing corresponding to the first video signal on the restoration signal on a basis of the first adjustment parameter included in the transmission information to generate an output video signal corresponding to the first video signal.

In the video system according to the embodiment of the present technology, the first image adjustment parameter and the second image adjustment parameter may include image adjustment parameters related to levels of the first video signal and the second video signal, and a dynamic range of the first video signal may be narrower than a dynamic range of the second video signal.

In the video system according to the embodiment of the present technology, the first image adjustment parameter and the second image adjustment parameter may include image adjustment parameters related to colors of the first video signal and the second video signal.

Further, in the video system according to the embodiment of the present technology, the first video signal may be an SDR (Standard Dynamic Range) video, and the second video signal may be an HDR (High Dynamic Range) video.

In the video system according to the embodiment of the present technology, the first processing circuit and the second processing circuit may be configured such that only the second video signal out of the first video signal and the second video signal is transmitted from the camera system to the video converter via a second transmission channel, and
the second processing circuit may be configured to transmit an output video signal corresponding to the first video signal to a display via a third transmission channel different from the second transmission channel.

A video processing method according to another embodiment of the present technology, includes:
generating, by a first processing circuit in a camera system, from a pixel signal generated by an image pickup unit that captures a subject and obtains a pixel signal thereof, a first video signal on a basis of a first image adjustment parameter, generating a second video signal on a basis of a second image adjustment parameter different from the first image adjustment parameter, and transmitting transmission information obtained by adding the first adjustment parameter and the second adjustment parameter to the second video signal via a first transmission channel;
receiving, by a video converter, the transmission information via the first transmission channel; and
generating, by a second processing circuit in the video converter, on a basis of the second image adjustment parameter included in the transmission information, a restoration pixel signal by inverse-transforming the second video signal included in the transmission information, and also carrying out adjustment processing corresponding to the first video signal on the restoration signal on a basis of the first adjustment parameter included in the transmission information to generate an output video signal corresponding to the first video signal.

A program according to another embodiment of the present technology is a program that causes a computer to operate as:
a camera system; and
a video converter,
the camera system including
a first processing circuit that generates, from a pixel signal generated by an image pickup unit that captures a subject and obtains a pixel signal thereof, a first video signal on a basis of a first image adjustment parameter, generates a second video signal on a basis of a second image adjustment parameter different from the first image adjustment parameter, and transmits transmission information obtained by adding the first adjustment parameter and the second adjustment parameter to the second video signal via a first transmission channel, the video converter receiving the transmission information via the first transmission channel and including a second processing circuit that generates, on a basis of the second image adjustment parameter included in the transmission information, a restoration pixel signal by inverse-transforming the second video signal included in the transmission information, and also carries out adjustment processing corresponding to the first video signal on the restoration signal on a basis of the first adjustment parameter included in the transmission information to generate an output video signal corresponding to the first video signal.

A camera system according to another embodiment of the present technology, includes a first processing circuit that generates, from a pixel signal generated by an image pickup unit that captures a subject and obtains a pixel signal thereof, a first video signal on a basis of a first image adjustment parameter, generates a second video signal on a basis of a second image adjustment parameter different from the first image adjustment parameter, and transmits transmission information obtained by adding the first adjustment parameter and the second adjustment parameter to the second video signal via a first transmission channel.

A video converter according to another embodiment of the present technology, includes a second processing circuit that generates, on a basis of a second image adjustment parameter included in transmission information transmitted from a camera system that generates, from a pixel signal generated by an image pickup unit that captures a subject and obtains a pixel signal thereof, a first video signal on a basis of a first image adjustment parameter, generates a second video signal on a basis of the second image adjustment parameter different from the first image adjustment parameter, and transmits transmission information obtained by adding the first adjustment parameter and the second adjustment parameter to the second video signal via a first transmission channel, a restoration pixel signal by inverse-transforming the second video signal included in the transmission information, and also carries out adjustment processing corresponding to the first video signal on the restoration signal on a basis of the first adjustment parameter included in the transmission information to generate an output video signal corresponding to the first video signal.

Advantageous Effects of Invention

As described above, according to the present technology, it is possible to solve various problems in a case of processing a plurality of video signals that have been respectively adjusted under mutually-different conditions.

MODES FOR CARRYING OUT THE INVENTION

Hereinafter, embodiments of the present technology will be described.

First Embodiment

[Configuration of Video System]

Figure 1:
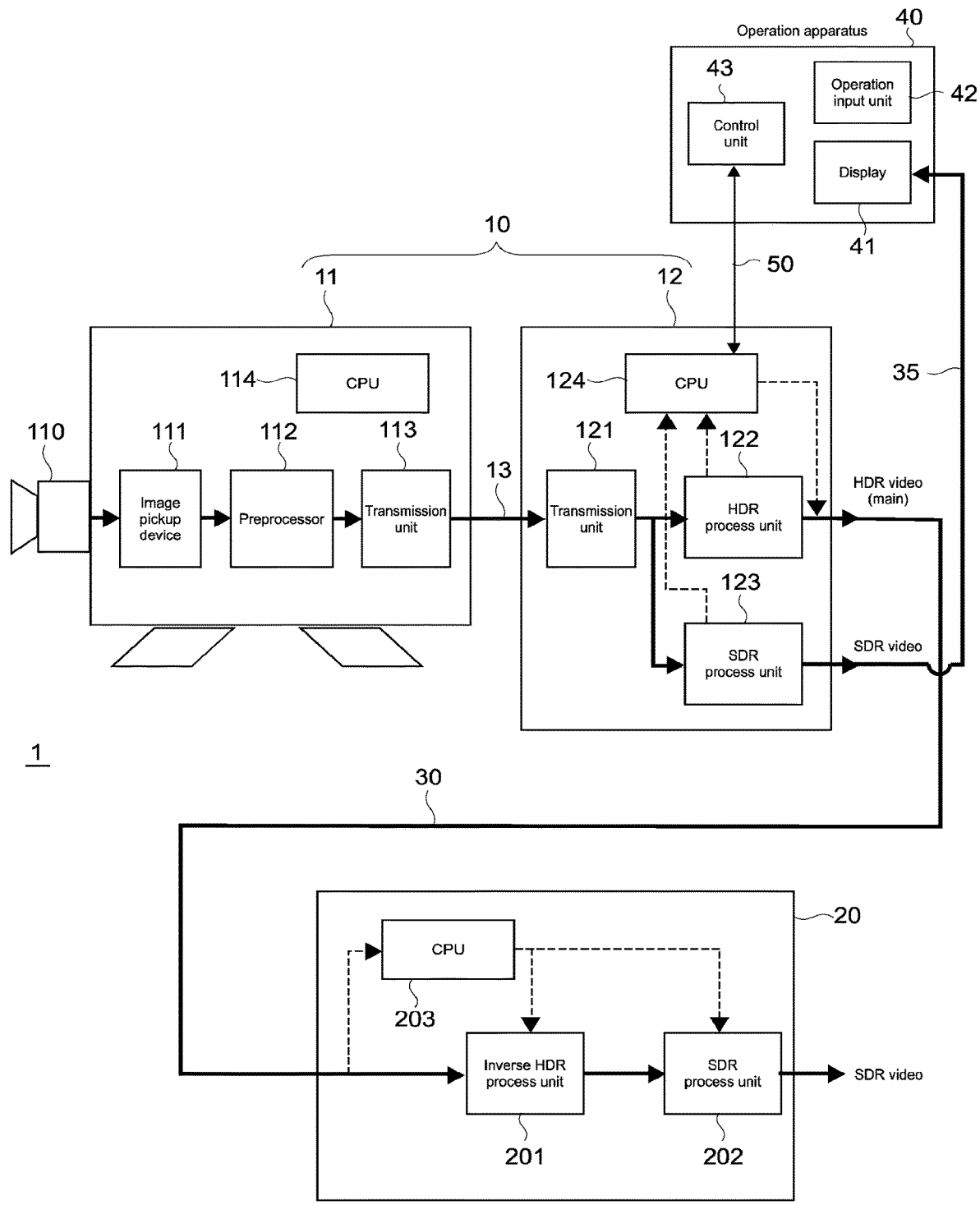
FIG. 1 A block diagram showing an overall configuration of a video system 1 according to a first embodiment of the present technology.

FIG. 1 is a block diagram showing an overall configuration of a video system 1 according to a first embodiment of the present technology.

As shown in the figure, this video system 1 includes a camera system 10 and a video converter 20. The camera system 10 and the video converter 20 are connected via a main transmission channel 30.

[Configuration of Camera System 10]

The camera system 10 includes an image pickup apparatus 11 and a camera control unit 12. The image pickup apparatus 11 and the camera control unit 12 are connected via a camera cable 13 such as an optical fiber.

The image pickup apparatus 11 includes an optical system 110 including a lens group for image pickup, an image pickup device 111, a preprocessor 112, a transmission unit 113, and a CPU 114.

The image pickup device 111 is an image sensor such as a CMOS (Complementary Metal-Oxide-Semiconductor) device and a CCD (Charge-Coupled Device), and converts light taken in via the optical system (not shown) into an electric pixel signal corresponding to a light intensity.

It should be noted that in the configuration of the video system 1 according to the present technology, an "image pickup unit" corresponds to the image pickup apparatus 11 described above.

The preprocessor 112 carries out signal correction processing such as defect correction on pixel signals obtained by the image pickup device 111 and lens aberration correction.

The transmission unit 113 carries out processing of transmitting the pixel signals output from the preprocessor 112 to the camera control unit 12 via the camera cable 13. Specifically, the pixel signals transmitted to the camera control unit 12 by the transmission unit 113 are RAW image signals that have not been subjected to processing related to a gain or dynamic range, debayer processing, gamma signal processing, and the like.

The CPU 114 is a controller that controls respective parts of the image pickup apparatus 11 and also communicates with a CPU 124 of the camera control unit 12 via the camera cable 13.

Meanwhile, the camera control unit 12 includes a transmission unit 121, an HDR process unit 122, an SDR process unit 123, and the CPU 124.

The transmission unit 121 is constituted of a communication circuit for performing wired or wireless communication, receives pixel signals transmitted from the image pickup apparatus 11 via the camera cable 13 (first transmission channel), and supplies the pixel signals to the HDR process unit 122 and the SDR process unit 123.

The HDR process unit 122 carries out processing of generating an HDR video while applying various adjustments to the pixel signals supplied from the transmission unit 121 on the basis of HDR adjustment parameter information. The HDR video generated by the HDR process unit 122 is transmitted to the video converter 20 via the main transmission channel 30 after the HDR adjustment parameter information and SDR adjustment parameter information are added thereto. It should be noted that as a method of adding adjustment parameter information, the CPU 124 may carry out processing of multiplexing adjustment parameter information to an HDR video stream and output it to the main transmission channel 30 as a metadata file associated with the HDR video stream separately from the HDR video. It should be noted that the main transmission channel 30 may be configured either as a single transmission channel or a plurality of transmission channels in which the HDR video stream is transmitted via a dedicated transmission channel having a larger transmission band than a general-purpose transmission channel, the adjustment parameter information is transmitted via a general-purpose transmission channel having a smaller transmission band than the dedicated transmission channel, and the like.

The SDR process unit 123 carries out processing of generating an SDR video on the pixel signals supplied from the transmission unit 121 while applying various adjustments on the basis of the SDR adjustment parameter information. The SDR video generated by the SDR process unit 123 is transmitted to a display 41 of an operation apparatus 40 of a video creator, for example, via an output transmission channel 35. The respective output transmission channels of the HDR process unit 121 and the SDR process unit 123 may be different transmission channels. For example, the SDR video is displayed on the display 41 of the operation apparatus 40 of the video creator via the output transmission channel 35 (third transmission channel) independent from the main transmission channel 30 (second transmission channel).

The HDR process unit 122, the SDR process unit 123, and the CPU 124 are constituted of one or a plurality of integrated circuits and the like, and correspond to a first processing circuit in the configuration of the present technology.

The CPU 124 is a controller that controls respective parts of the camera control unit 12. The CPU 124 is capable of communicating with the HDR process unit 122 and the SDR process unit 123 to control selections of adjustment contents to be applied to image signals in respective processes.

Further, the CPU 124 performs control to add the parameter information used for performing the adjustments on the pixel signals in the HDR process by the HDR process unit 122 and the SDR process by the SDR process unit 123 to the HDR video generated by the HDR process unit 122, and transmit it to the video converter 20 via the main transmission channel 30.

The CPU 124 is capable of communicating with the operation apparatus 40 connected via a communication channel 50 such as a LAN (Local Area Network). The operation apparatus 40 includes the display 41, an operation input unit 42, and a control unit 43. The operation apparatus 40 may be constituted of, for example, an information processing apparatus such as a personal computer, a dedicated control panel for camera control, or the like. The operation input unit 42 may be constituted of, for example, operation keys, a mouse, a trackball, a dial, a lever, a touch sensor panel, a remote controller, or the like. The control unit 43 of the operation apparatus 40 is constituted of a circuit such as a CPU, receives various control commands and setting information from a creator such as a VE (Video Engineer), and communicates with the CPU 124 of the camera control unit 12 via the communication channel 50.

[Configurations of HDR Process Unit 122 and SDR Process Unit 123]

Figure 2:
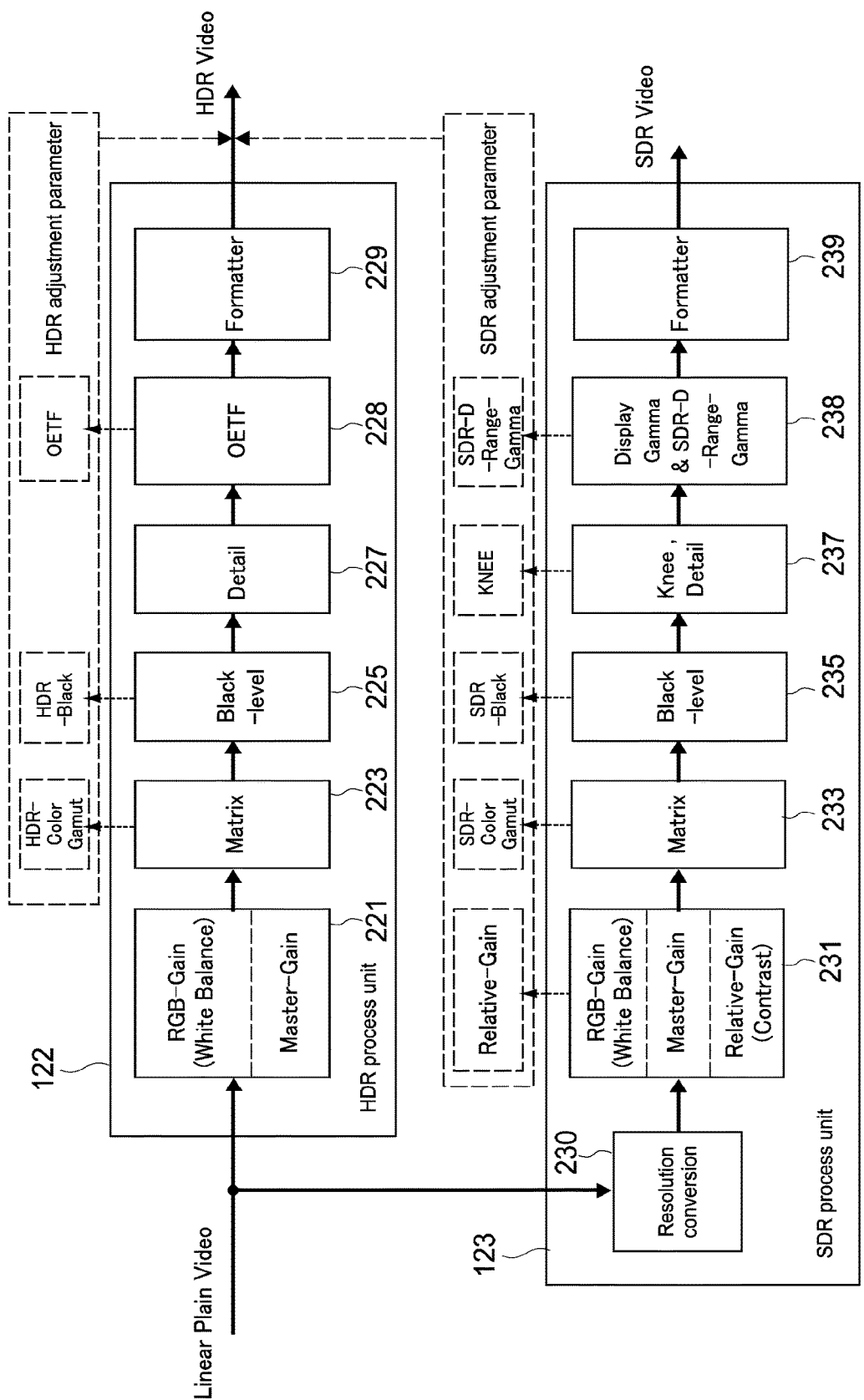
FIG. 2 A block diagram showing functional configurations of an HDR process unit 122 and SDR process unit 123 of a camera control unit 12 in the video system 1 according to the first embodiment.

FIG. 2 is a block diagram showing functional configurations of the HDR process unit 122 and SDR process unit 123 of the camera control unit 12.

The HDR process unit 122 includes an HDR gain adjustment unit 221, a matrix processing unit 223, a black level correction unit 225, a detail processing unit 227, an OETF unit 228, and a formatter 229.

In addition to control of a master gain, the HDR gain adjustment unit 221 controls an RGB gain for a white balance adjustment.

On the basis of color gamut information (HDR-Color Gamut) which is a part of the HDR adjustment parameter information and is information related to colors of an HDR video, the matrix processing unit 223 carries out debayer processing, linear matrix processing, and the like on the pixel signals that have passed the HDR gain adjustment unit 221, and obtains color image data.

The black level correction unit 225 carries out black level correction of the color image data on the basis of information for black level correction as a part of the HDR adjustment parameter information (HDR-Black).

The detail processing unit 227 carries out detail processing of the color image data.

The OETF unit 228 carries out OETF (Optical-Electro Transfer Function) gamma signal processing on the color image data on the basis of OETF information which is information related to an HDR transmission gamma which is a part of the HDR adjustment parameter information.

The formatter 229 converts the color image data that has passed through the OETF unit 228 into an HDR video transmission format.

Meanwhile, the SDR process unit 123 includes a resolution conversion unit 230, an SDR gain adjustment unit 231, a matrix processing unit 233, a black level correction unit 235, a knee/detail processing unit 237, a gamma processing unit 238, and a formatter 239.

The resolution conversion unit 230 converts a resolution of pixel signals transmitted from the image pickup apparatus 11 (e.g., 4K resolution) into an HD resolution.

The SDR gain adjustment unit 231 controls a master gain on the basis of a relative gain (Relative-Gain) which is a part of the SDR adjustment parameter information and is parameter information related to levels of an SDR video and an HDR video, and also controls an RGB gain for a white balance adjustment.

The relative gain is a parameter that indicates a ratio between a gain for pixel signals in the HDR process and a gain for pixel signals in the SDR process so as to enable a contrast ratio between the HDR video and the SDR video to be adjusted. For example, a relative range defines how many times the dynamic range of the SDR video the dynamic range of the HDR video is to be set to. By this relative range, the ratio of the master gain on the SDR process side to the master gain on the HDR process side can be set to an arbitrary ratio such as 1 and ½, for example. If the ratio of the master gain on the SDR process side to the master gain on the HDR process side is set in this way, the dynamic range of the HDR video correlated with the dynamic range of the SDR video can be obtained.

More specifically, an upper limit reference of the dynamic range of the SDR video is given by reference white (Diffuse-White) selected by the creator. In the video system 1 according to this embodiment, by selecting this reference white (Diffuse-White) of the SDR video, an upper limit reference of the dynamic range of the HDR video (reference white (Diffuse-White) of HDR video) is also determined on the basis of the correlation based on the relative range.

The relative range should be selected as appropriate in accordance with a shooting environment such as daytime, nighttime, indoor, outdoor, inside a studio, fine weather, and rainy weather. Therefore, a plurality of types of relative ranges associated with various shooting environments are prepared. As a method of preparing a plurality of types of relative ranges associated with the shooting environments, there is a method of comparing, by human eyes, brightness of appearance of the SDR video and HDR video simultaneously output from the camera control unit 12. It is only necessary to change the value of the relative range and compare the SDR video and the HDR video every time the value is changed, and determine a relative range in which the brightness in appearance of the SDR video is close to that of the HDR video as a relative range optimum for the shooting environment.

It should be noted that the relative gain only needs to be information for carrying out white balance processing or contrast processing for the SDR video and may be, for example, information other than a numerical value of the ratio with respect to the gain of the HDR signal, such as a gain value with respect to RAW data as a sensor output value.

It should be noted that a luminance dynamic range of an HDR video is wider than a luminance dynamic range of an SDR video. For example, assuming that the luminance dynamic range of the SDR video is 0 to 100%, the luminance dynamic range of the HDR video is, for example, 100% to 1300%, 100% to 10000%, or the like. An output luminance range of the image pickup apparatus 11 is 0 to 600% or the like.

On the basis of the color gamut information (SDR-Color Gamut) which is a part of the SDR adjustment parameter information and is information related to colors of the SDR video, the matrix processing unit 233 carries out debayer processing, linear matrix processing, and the like on the pixel signals that have passed through the SDR gain adjustment unit 231, to obtain color image data.

The black level correction unit 235 carries out black level correction of the color image data on the basis of the information for black level correction which is a part of the SDR adjustment parameter information (SDR-Black).

The knee/detail processing unit 237 carries out knee correction on the color image data on the basis of information related to the knee correction (KNEE) which is a part of the SDR adjustment parameter information, and also carries out detail processing.

On the basis of information related to dynamic range compression which is a part of the SDR adjustment parameter information (SDR-D-Range-Gamma), the gamma processing unit 238 carries out gamma signal processing on the dynamic range set by the SDR gain adjustment unit 231, and simultaneously carries out gamma signal processing for display.

The formatter 239 converts the color image data into an SDR video transmission format.

These pieces of parameter information are set by the creator such as a VE (Video Engineer) who operates an operation apparatus connected to the camera control unit 12 via a communication channel such as a LAN (Local Area Network).

[Configuration of Video Converter 20]

The video converter 20 includes an inverse HDR process unit 201, an SDR process unit 202, and a CPU 203.

The CPU 203 extracts the HDR adjustment parameter information and the SDR adjustment parameter information from the parameter-information-attached HDR video received via the main transmission channel 30 and supplies the HDR adjustment parameter information to the inverse HDR process unit 201. Further, the CPU 203 supplies the SDR adjustment parameter information to the SDR process unit 202.

The inverse HDR process unit 201 carries out an inverse HDR process on the HDR video received via the main transmission channel 30 using the HDR adjustment parameter information. Specifically, the inverse HDR process unit 201 removes adjustment components from the HDR video and generates restoration pixel signals.

The SDR process unit 202 generates an output video signal corresponding to the SDR video generated by the camera control unit 12 from the restoration pixel signals obtained by the inverse HDR process unit 201 using the SDR adjustment parameter information.

The inverse HDR process unit 201, the SDR process unit 202, and the CPU 203 are constituted of one or a plurality of integrated circuits or the like and correspond to a second processing circuit in the configuration of the present technology.

[Configuration of Inverse HDR Process Unit 201 and SDR Process Unit 202]

Figure 3:
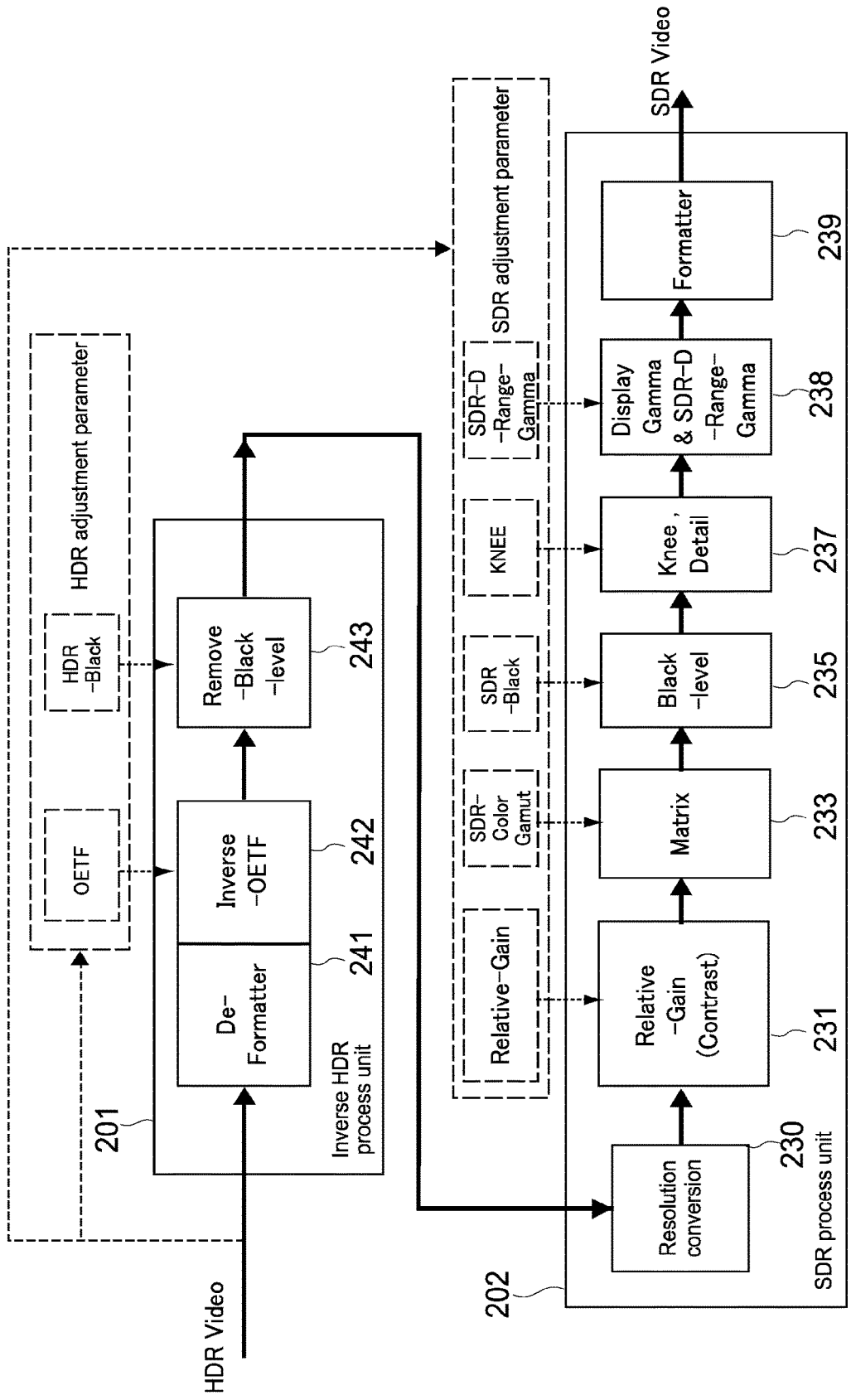
FIG. 3 A block diagram showing functional configurations of an inverse HDR process unit 201 and SDR process unit 202 of a video converter 20 in the video system 1 according to the first embodiment.

FIG. 3 is a block diagram showing functional configurations of the inverse HDR process unit 201 and SDR process unit 202 in the video converter 20.

The inverse HDR process unit 201 includes a de-formatter 241, an inverse OETF unit 242, and a black level correction removal unit 243.

The de-formatter 241 cancels the HDR video transmission format.

The inverse OETF unit 242 removes the gamma of OETF applied to the HDR video on the basis of information related to an HDR transmission gamma (type of OETF) which is part of the HDR adjustment parameter information.

The black level correction removal unit 243 carries out processing of canceling the black level correction applied to the HDR video on the basis of information for black level correction (HDR-Black) which is a part of the HDR adjustment parameter information.

The configuration of the SDR process unit 202 of the video converter 20 is the same as that of the SDR process unit 202 of the camera control unit 12. Specifically, the SDR process unit 202 of the video converter 20 includes a resolution conversion unit 230, an SDR gain adjustment unit 231, a matrix processing unit 233, a black level correction unit 235, a knee/detail processing unit 237, a gamma processing unit 238, and a formatter 239.

Here, the reason why the HDR video is transmitted to the video converter 20 via the main transmission channel 30 out of the HDR video and the SDR video generated by the camera system 10 is that the SDR video is used for checking a state of appearance of a video by the video creator and only the HDR video is transmitted via the main transmission channel 30. Further, if the HDR video and the SDR video are simultaneously transmitted via the main transmission channel 30, a pressure may be applied to the transmission band of the main transmission channel 30. Due to the circumstances as described above, it is desirable to transmit only the HDR video via the main transmission channel 30. In this regard, the camera system 10 may take a configuration in which, for example, while the output transmission channel 35 of the SDR process unit 123 outputs an SDR video and an SDR video for visually checking a shot video is displayed on the display 41 of the operation apparatus 40, the SDR video is not output to the main transmission path 30.

Further, there is a demand for a plurality of creators to simultaneously check an expression of a created video at different places. Although it is possible to check the HDR video received via the main transmission channel 30 by a monitor capable of displaying an HDR video, there is a strong demand for the selection of an expression including brightness, colors, and the like of a video to be performed on the basis of the SDR video that has been adjusted during shooting in accordance with a traditional method. Furthermore, even if the HDR video resolution is changed to the SDR video resolution by a down conversion and displayed on the monitor, an expression of the appearance differs from that of the HDR video due to a difference in the dynamic ranges between the HDR video and the SDR video. The video system 1 of this embodiment has been proposed in view of the circumstances as described above.

Further, even in a case where the HDR video and the SDR video are required as a main video at the same time, handling both videos equally in the entire system configuration is uneconomical because it definitely requires two systems. Therefore, by handling the main video as an HDR video and converting it into SDR at a final stage, there is an advantage that both of the videos can be handled as a main video.

[Operation of Video System 1]

Next, descriptions will be given on an operation in a case where, in this video system 1, out of an HDR video and SDR video generated by the camera system 10, the HDR video is transmitted to the video converter 20 via the main transmission channel 30, and the video converter 20 generates, from the HDR video, output video signals corresponding to the SDR video generated by the camera system 10.

(Operation of Camera System 10)

Pixel signals obtained by the image pickup apparatus 11 are transmitted to the camera control unit 12 via the camera cable 13 by the transmission unit 113. In the camera control unit 12, the pixel signals received by the transmission unit 121 are supplied to the HDR process unit 122 and the SDR process unit 123.

While an HDR video is generated from the pixel signals in the HDR process unit 122, various adjustments are applied on the basis of HDR adjustment parameter information supplied from the CPU 124. Similarly, while an SDR video is generated from the pixel signals also in the SDR process unit 123, various adjustments are applied on the basis of SDR adjustment parameter information supplied from the CPU 124.

The CPU 124 performs control to add the HDR adjustment parameter information used for adjusting the HDR video in the HDR process unit 122 and the SDR adjustment parameter information used for adjusting the SDR video in the SDR process unit 123 to the HDR video and transmit it to the video converter 20 via the main transmission channel 30.

On the other hand, the SDR video generated by the SDR process unit 123 is transmitted to the display 41 of the operation apparatus 40 of the video creator, for example, and displayed.

(Operation of Video Converter 20)

Next, descriptions will be given on an operation of the video converter 20 for processing a parameter-information-attached HDR video transmitted from the camera control unit 12 via the main transmission channel 30.

In the video converter 20, when the parameter-information-attached HDR video is received via the main transmission channel 30, the CPU 203 extracts each of the HDR adjustment parameter information and the SDR adjustment parameter information from the received parameter-information-attached HDR video. The CPU 203 supplies the extracted HDR adjustment parameter information to the inverse HDR process unit 201 and also supplies the SDR adjustment parameter information to the SDR process unit 202.

The inverse HDR process unit 201 carries out an inverse transformation on the HDR video using the HDR adjustment parameter information supplied from CPU 203, to generate restoration pixel signals obtained by restoring the original pixel signals. The restoration pixel signals are supplied to the SDR process unit 202.

In the SDR process unit 202, output video signals corresponding to the SDR video generated in the camera control unit 12 are generated from the restoration pixel signals obtained by the inverse HDR process unit 201 using the SDR adjustment parameter information. The output video signals corresponding to the generated SDR video are transmitted and displayed on a display different from the display 41 of the operation apparatus 40 to which the SDR video generated by the camera control unit 12 is transmitted, for example.

As described above, according to the video system 1 of this embodiment, the camera control unit 12 adds the HDR adjustment parameter information and the SDR adjustment parameter information to the generated HDR video and transmits it to the video converter 20 via the main transmission channel 30. The video converter 20 restores the original pixel signals on the basis of the HDR adjustment parameter information added to the HDR video and reproduces, with respect to this restoration pixel signals, output video signals corresponding to the SDR video generated in the camera control unit 12 on the basis of the SDR adjustment parameter information added to the HDR video. Accordingly, in the camera control unit 12, output video signals having expressions essentially close to those of the SDR video generated simultaneous with the HDR video from the pixel signals can be obtained by the conversion from the HDR video in the video converter 20.

Second Embodiment

Next, a second embodiment of the present technology will be described.

Figure 4:
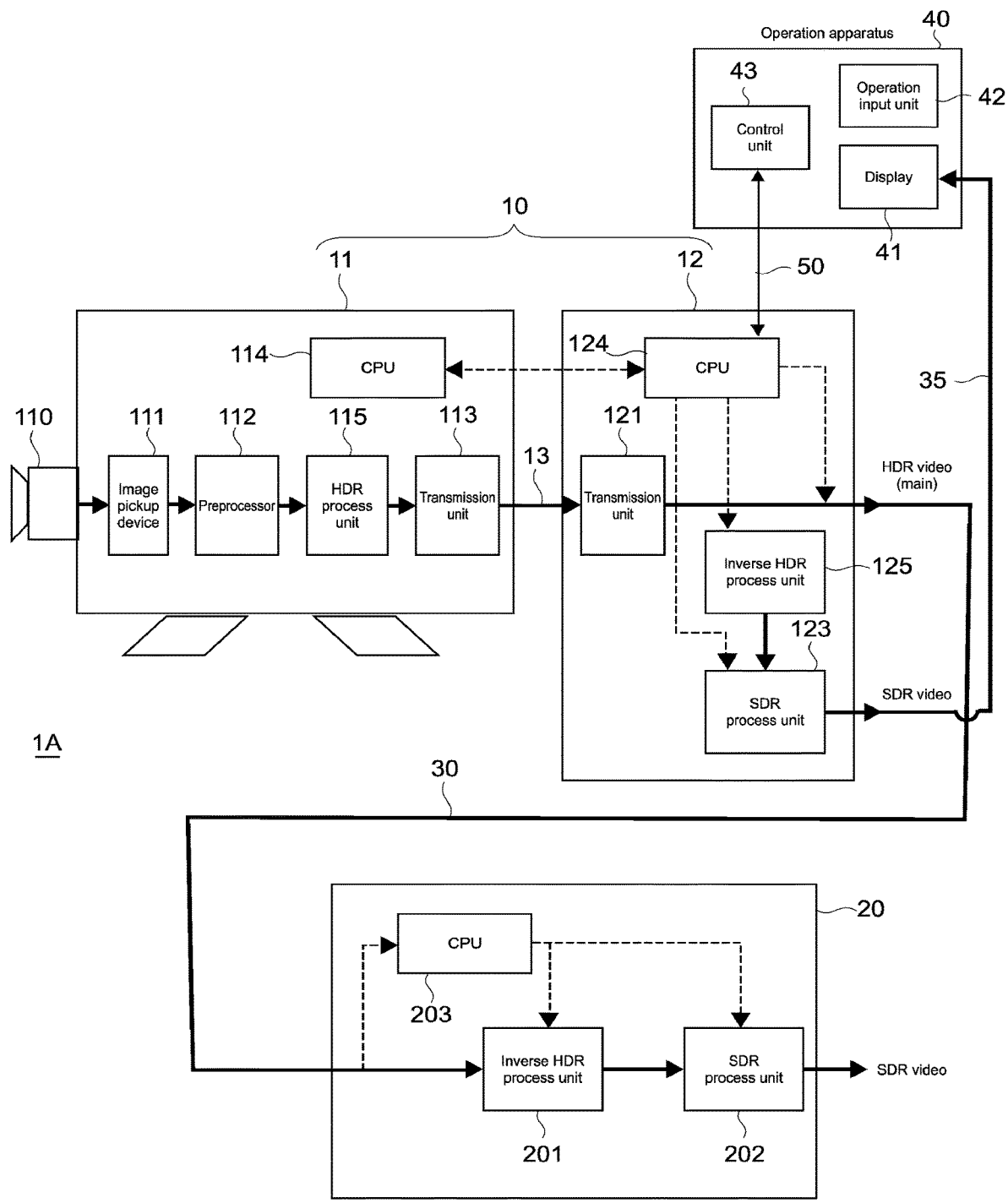
FIG. 4 A block diagram showing an overall configuration of a video system 1A according to a second embodiment of the present technology.

FIG. 4 is a block diagram showing a configuration of a video system 1A according to the second embodiment of the present technology.

This video system 1A includes an HDR process unit 115 in the image pickup apparatus 11.

The HDR process unit 115 generates an HDR video while applying various adjustments to pixel signals output from the preprocessor 112 on the basis of HDR adjustment parameter information, and supplies it to the transmission unit 113. The transmission unit 113 transmits the HDR video supplied from the HDR process unit 115 to the camera control unit 12 via the camera cable 13.

The CPU 114 of the image pickup apparatus 11 communicates with the CPU 124 of the camera control unit 12 via the camera cable 13 and notifies the CPU 124 of the camera control unit 12 of the HDR adjustment parameter information used for generating the HDR video in the HDR process unit 115.

The camera control unit 12 includes the transmission unit 121, an inverse HDR process unit 125, the SDR process unit 123, and the CPU 124.

The CPU 124 communicates with the CPU 114 of the image pickup apparatus 11 via the camera cable 13 to receive the HDR adjustment parameter information from the CPU 114 of the image pickup apparatus 11 and supply it to the inverse HDR process unit 125.

The transmission unit 121 of the camera control unit 12 supplies the HDR video transmitted from the image pickup apparatus 11 via the camera cable 13 to the inverse HDR process unit 125 and also transmits it to the main transmission channel 30.

The inverse HDR process unit 125 generates restoration pixel signals by removing adjustment components from the HDR video using the HDR adjustment parameter information supplied from the CPU 124, and supplies it to the SDR process unit 123.

The SDR process unit 123 carries out processing of generating an SDR video while applying various adjustments to the restoration pixel signals on the basis of the SDR adjustment parameter information. The SDR video generated by the SDR process unit 123 is transmitted to and displayed on the display 41 of the operation apparatus 40 of the video creator, for example.

Further, the CPU 124 performs control to add the HDR adjustment parameter information used for generating the restoration pixel signals from the HDR video in the inverse HDR process by the inverse HDR process unit 125 and the SDR adjustment parameter information used for applying adjustments to the SDR video in the SDR process unit 123, to the HDR video, and transmit it to the video converter 20 via the main transmission channel 30.

The HDR process unit 115 and CPU 114 of the image pickup apparatus 11 and the inverse HDR process unit 125, SDR process unit 123, and CPU 124 of the camera control unit 12 correspond to the first processing circuit in the configuration of the present technology.

The video converter 20 includes the inverse HDR process unit 201, the SDR process unit 202, and the CPU 203. These are the same as the configuration of the video converter 20 according to the first embodiment.

[Configuration of Inverse HDR Process Unit 125 and SDR Process Unit 123]

Figure 5:
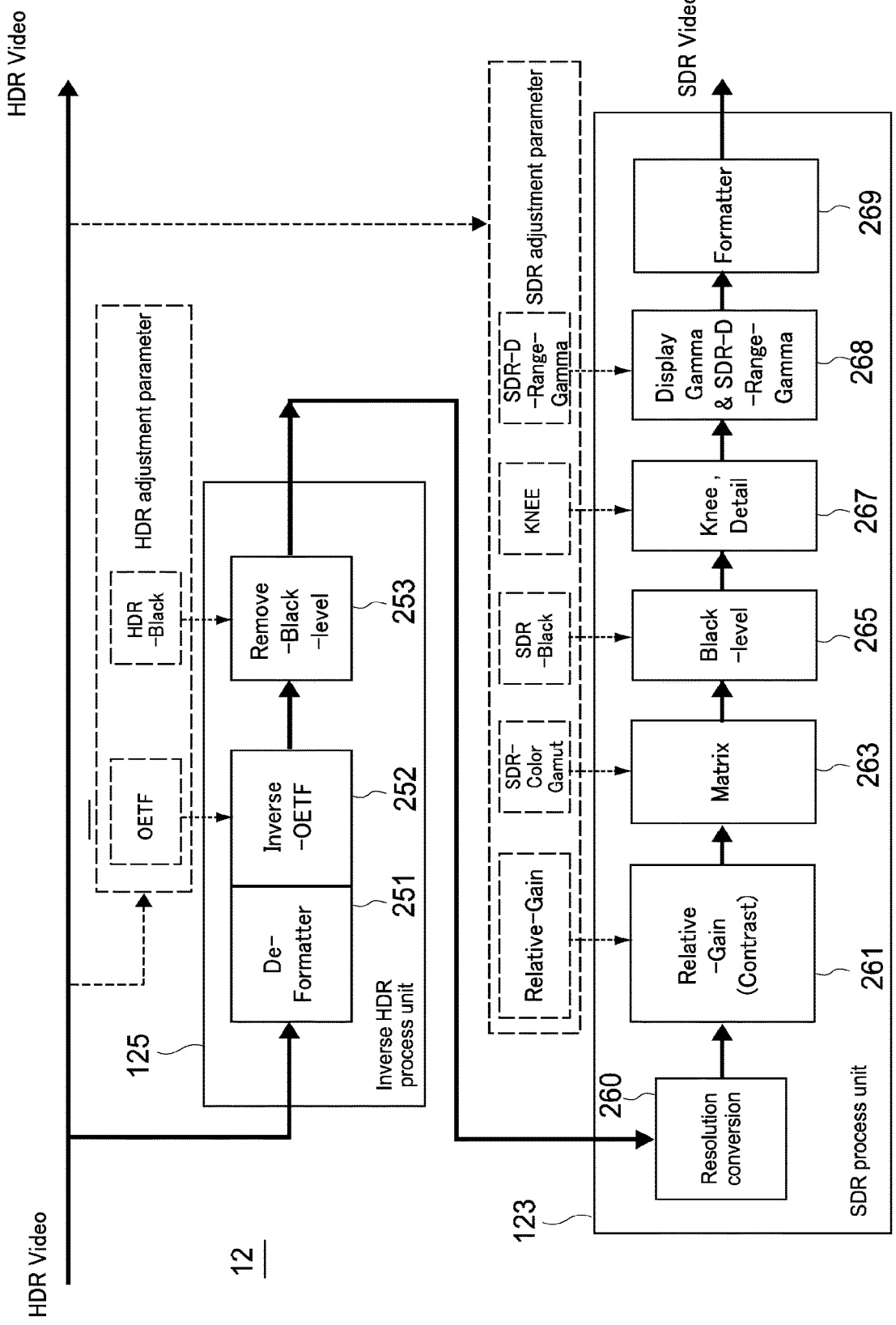
FIG. 5 A block diagram showing functional configurations of an inverse HDR process unit 125 and SDR process unit 123 of the camera control unit 12 in the video system 1A according to the second embodiment.

FIG. 5 is a block diagram showing functional configurations of the inverse HDR process unit 125 and SDR process unit 123 of the camera control unit 12.

The inverse HDR process unit 125 includes a de-formatter 251, an inverse OETF unit 252, and a black level correction removal unit 253.

The de-formatter 251 cancels an HDR video transmission format.

The inverse OETF unit 252 removes a gamma of OETF applied to the HDR video on the basis of information related to an HDR transmission gamma (type of OETF) which is a part of the HDR adjustment parameter information.

The black level correction removal unit 253 carries out processing of canceling the black level correction applied to the HDR video on the basis of information for black level correction (HDR-Black) which is a part of the HDR adjustment parameter information.

The SDR process unit 123 includes a resolution conversion unit 260, an SDR gain adjustment unit 261, a matrix processing unit 263, a black level correction unit 265, a knee/detail processing unit 267, a gamma processing unit 268, and a formatter 269. The configuration of this SDR process unit 123 is the same as that of the SDR process unit 202 of the camera control unit 12.

[Operation of Video System 1A]

Next, an operation of the video system 1A will be described.

(Operation of Camera System 10)

In the image pickup apparatus 11, pixel signals output from the preprocessor 112 are supplied to the HDR process unit 115, and the HDR process unit 115 generates an HDR video while applying various adjustments on the basis of HDR adjustment parameter information supplied from the CPU 114. The generated HDR video is transmitted to the camera control unit 12 via the camera cable 13 by the transmission unit 113. Further, the CPU 114 of the image pickup apparatus 11 communicates with the CPU 124 of the camera control unit 12 via the camera cable 13 to notify the CPU 124 of the camera control unit 12 of the HDR adjustment parameter information used for adjusting the HDR video in the HDR process unit 115.

The CPU 124 of the camera control unit 12 supplies the HDR adjustment parameter information notified by the CPU 114 of the image pickup apparatus 11 to the inverse HDR process unit 125.

Further, the HDR video received by the transmission unit 121 of the camera control unit 12 is passed through the camera control unit 12 to be supplied to the main transmission channel 30, and is transmitted to the video converter 20 via the main transmission channel 30. Moreover, the HDR video received by the transmission unit 121 is also supplied to the inverse HDR process unit 125.

In the inverse HDR process unit 125, restoration pixel signals are generated by removing adjustment components from the HDR video using the HDR adjustment parameter information supplied from the CPU 124. The generated restoration pixel signals are supplied to the SDR process unit 123. Then, in the SDR process unit 123, processing of generating an SDR video is carried out while applying various adjustments to the restoration pixel signals on the basis of the SDR adjustment parameter information supplied from the CPU 124. The generated SDR video is transmitted to and displayed on the display 41 of the operation apparatus 40 of the video creator, for example.

The CPU 124 performs control to add the HDR adjustment parameter information notified by the CPU 114 of the image pickup apparatus 11 and the SDR adjustment parameter information used for adjusting the restoration pixel signals by the SDR process unit 123, to the HDR video that is to be passed through the camera control unit 12, and transmit it to the video converter 20 via the main transmission channel 30.

The operation of the video converter 20 is the same as that of the first embodiment. In other words, as the parameter-information-attached HDR video is received by the video converter 20 via the main transmission channel 30, the CPU 203 extracts each of the HDR adjustment parameter information and the SDR adjustment parameter information from the received parameter-information-attached HDR video. The CPU 203 supplies the extracted HDR adjustment parameter information to the inverse HDR process unit 201 and also supplies the SDR adjustment parameter information to the SDR process unit 202.

The inverse HDR process unit 201 carries out inverse transformation on the HDR video using the HDR adjustment parameter information supplied from CPU 203, and generates restoration pixel signals obtained by restoring the original pixel signals. The restoration pixel signals are supplied to the SDR process unit 202.

In the SDR process unit 202, output video signals corresponding to the SDR video generated in the camera control unit 12 are generated from the restoration pixel signals obtained by the inverse HDR process unit 201 using the SDR adjustment parameter information. The generated output video signals are transmitted to and displayed on a display different from the display 41 of the operation apparatus 40 to which the SDR video generated by the camera control unit 12 is transmitted, for example.

As described above, also with the video system 1A according to this embodiment, output video signals having expressions essentially close to those of the SDR video generated simultaneous with the HDR video from the pixel signals in the camera control unit 12 can be obtained by the conversion from the HDR video in the video converter 20.

Modified Example 1

Each of the camera control unit 12 and the video converter 20 can be configured using a computer. In other words, by installing a program for causing the computer to operate as the camera control unit 12 and the video converter 20 in each of the computers, a video system including functions equivalent to those of the first embodiment and the second embodiment can be realized.

Modified Example 2

In the embodiments described above, the case of processing the HDR video and the SDR video has been described. However, the present technology is generally applicable to a case where two video signals are respectively generated from pixel signals while applying mutually-different adjustments and is not limited to only the HDR video and the SDR video. Particularly in a case where the different adjustments on the two video signals are adjustments related to colors, a video signal having an expression close to that of the other video signal generated simultaneously from the pixel signals can be obtained by a conversion from one of the video signals.

Modified Example 3

Further, in a case where the present technology is applied to two video signals having two different dynamic ranges, by setting the video signal to which the inverse transformation is to be performed as a video signal having a wider dynamic range as in a magnitude relationship of the dynamic ranges between the HDR video and the SDR video, a video signal having an expression close to the video signal having a narrower dynamic range, that is generated from the pixel signals in the camera control unit, can be obtained by a conversion from the HDR video in the video converter.

It should be noted that the present technology can also take the following configurations.
(1) A video system, including:
  a camera system; and
  a video converter,
  the camera system including
    a first processing circuit that generates, from a pixel signal generated by an image pickup unit that captures a subject and obtains a pixel signal thereof, a first video signal on a basis of a first image adjustment parameter, generates a second video signal on a basis of a second image adjustment parameter different from the first image adjustment parameter, and transmits transmission information obtained by adding the first adjustment parameter and the second adjustment parameter to the second video signal via a first transmission channel,
  the video converter receiving the transmission information via the first transmission channel and including
    a second processing circuit that generates, on a basis of the second image adjustment parameter included in the transmission information, a restoration pixel signal by inverse-transforming the second video signal included in the transmission information, and also carries out adjustment processing corresponding to the first video signal on the restoration signal on a basis of the first adjustment parameter included in the transmission information to generate an output video signal corresponding to the first video signal.
(2) The video system according to (1), in which
  the first image adjustment parameter and the second image adjustment parameter include image adjustment parameters related to levels of the first video signal and the second video signal, and a dynamic range of the first video signal is narrower than a dynamic range of the second video signal.
(3) The video system according to (1) or (2), in which
  the first image adjustment parameter and the second image adjustment parameter include image adjustment parameters related to colors of the first video signal and the second video signal.
(4) The video system according to any one of (1) to (3), in which
  the first video signal is an SDR (Standard Dynamic Range) video, and the second video signal is an HDR (High Dynamic Range) video.
(5) The video system according to any one of (1) to (4), in which
  the first processing circuit and the second processing circuit are configured such that only the second video signal out of the first video signal and the second video signal is transmitted from the camera system to the video converter via a second transmission channel, and
  the second processing circuit is configured to transmit an output video signal corresponding to the first video signal to a display via a third transmission channel different from the second transmission channel.
(6) The video system according to any one of (1) to (5), in which
  the first image adjustment parameter includes a relative range that indicates a ratio of a gain with respect to the first video signal and a gain with respect to the second video signal.
(7) The video system according to any one of (1) to (6), in which
  the first image adjustment parameter includes color gamut information of the first video signal.
(8) The video system according to any one of (1) to (7), in which
  the first image adjustment parameter includes information for performing black level correction.
(9) The video system according to any one of (1) to (8), in which
  the first image adjustment parameter includes information related to knee correction.
(10) The video system according to any one of (1) to (9), in which
  the first image adjustment parameter includes information related to dynamic range compression.

(11) The video system according to any one of (1) to (10), in which
the second image adjustment parameter includes OETF (Optical-Electro Transfer Function) information.
(12) The video system according to any one of (1) to (11), in which
the second image adjustment parameter includes color gamut information of the second video signal.
(13) The video system according to any one of (1) to (12), in which
the second image adjustment parameter includes information for performing black level correction.
(14) A video processing method, including:
generating, by a first processing circuit in a camera system, from a pixel signal generated by an image pickup unit that captures a subject and obtains a pixel signal thereof, a first video signal on a basis of a first image adjustment parameter, generating a second video signal on a basis of a second image adjustment parameter different from the first image adjustment parameter, and transmitting transmission information obtained by adding the first adjustment parameter and the second adjustment parameter to the second video signal via a first transmission channel;
receiving, by a video converter, the transmission information via the first transmission channel; and
generating, by a second processing circuit in the video converter, on a basis of the second image adjustment parameter included in the transmission information, a restoration pixel signal by inverse-transforming the second video signal included in the transmission information, and also carrying out adjustment processing corresponding to the first video signal on the restoration signal on a basis of the first adjustment parameter included in the transmission information to generate an output video signal corresponding to the first video signal.
(15) The video processing method according to (14), in which
the first image adjustment parameter and the second image adjustment parameter include image adjustment parameters related to levels of the first video signal and the second video signal, and a dynamic range of the first video signal is narrower than a dynamic range of the second video signal.
(16) The video processing method according to (14) or (15), in which
the first image adjustment parameter and the second image adjustment parameter include image adjustment parameters related to colors of the first video signal and the second video signal.
(17) The video processing method according to any one of (14) to (16), in which
the first video signal is an SDR (Standard Dynamic Range) video, and the second video signal is an HDR (High Dynamic Range) video.
(18) The video processing method according to any one of (14) to (17), in which
the first processing circuit and the second processing circuit are configured such that only the second video signal out of the first video signal and the second video signal is transmitted from the camera system to the video converter via a second transmission channel, and
the second processing circuit is configured to transmit an output video signal corresponding to the first video signal to a display via a third transmission channel different from the second transmission channel.
(19) The video processing method according to any one of (14) to (18), in which
the first image adjustment parameter includes a relative range that indicates a ratio of a gain with respect to the first video signal and a gain with respect to the second video signal.
(20) The video processing method according to any one of (14) to (19), in which
the first image adjustment parameter includes color gamut information of the first video signal.
(21) The video processing method according to any one of (14) to (20), in which
the first image adjustment parameter includes information for performing black level correction.
(22) The video processing method according to any one of (14) to (21), in which
the first image adjustment parameter includes information related to knee correction.
(23) The video processing method according to any one of (14) to (22), in which
the first image adjustment parameter includes information related to dynamic range compression.
(24) The video processing method according to any one of (14) to (23), in which
the second image adjustment parameter includes OETF (Optical-Electro Transfer Function) information.
(25) The video processing method according to any one of (14) to (24), in which
the second image adjustment parameter includes color gamut information of the second video signal.
(26) The video processing method according to any one of (14) to (25), in which
the second image adjustment parameter includes information for performing black level correction.
(27) A program that causes a computer to operate as:
a camera system; and
a video converter,
the camera system including
a first processing circuit that generates, from a pixel signal generated by an image pickup unit that captures a subject and obtains a pixel signal thereof, a first video signal on a basis of a first image adjustment parameter, generates a second video signal on a basis of a second image adjustment parameter different from the first image adjustment parameter, and transmits transmission information obtained by adding the first adjustment parameter and the second adjustment parameter to the second video signal via a first transmission channel,
the video converter receiving the transmission information via the first transmission channel and including
a second processing circuit that generates, on a basis of the second image adjustment parameter included in the transmission information, a restoration pixel signal by inverse-transforming the second video signal included in the transmission information, and also carries out adjustment processing corresponding to the first video signal on the restoration signal on a basis of the first adjustment parameter included in the transmission information to generate an output video signal corresponding to the first video signal.
(28) The program according to (27), in which
the first image adjustment parameter and the second image adjustment parameter include image adjustment parameters related to levels of the first video signal and the second video signal, and a dynamic range of the first video signal is narrower than a dynamic range of the second video signal.

(29) The program according to (27) or (28), in which
the first image adjustment parameter and the second image adjustment parameter include image adjustment parameters related to colors of the first video signal and the second video signal.

(30) The program according to any one of (27) to (29), in which
the first video signal is an SDR (Standard Dynamic Range) video, and the second video signal is an HDR (High Dynamic Range) video.

(31) The program according to any one of (27) to (30), in which
the first processing circuit and the second processing circuit are configured such that only the second video signal out of the first video signal and the second video signal is transmitted from the camera system to the video converter via a second transmission channel, and
the second processing circuit is configured to transmit an output video signal corresponding to the first video signal to a display via a third transmission channel different from the second transmission channel.

(32) The program according to any one of (27) to (31), in which
the first image adjustment parameter includes a relative range that indicates a ratio of a gain with respect to the first video signal and a gain with respect to the second video signal.

(33) The program according to any one of (27) to (32), in which
the first image adjustment parameter includes color gamut information of the first video signal.

(34) The program according to any one of (27) to (33), in which
the first image adjustment parameter includes information for performing black level correction.

(35) The program according to any one of (27) to (34), in which
the first image adjustment parameter includes information related to knee correction.

(36) The program according to any one of (27) to (35), in which
the first image adjustment parameter includes information related to dynamic range compression.

(37) The program according to any one of (27) to (36), in which
the second image adjustment parameter includes OETF (Optical-Electro Transfer Function) information.

(38) The program according to any one of (27) to (37), in which
the second image adjustment parameter includes color gamut information of the second video signal.

(39) The program according to any one of (27) to (38), in which
the second image adjustment parameter includes information for performing black level correction.

(40) A camera system, including
a first processing circuit that generates, from a pixel signal generated by an image pickup unit that captures a subject and obtains a pixel signal thereof, a first video signal on a basis of a first image adjustment parameter, generates a second video signal on a basis of a second image adjustment parameter different from the first image adjustment parameter, and transmits transmission information obtained by adding the first adjustment parameter and the second adjustment parameter to the second video signal via a first transmission channel.

(41) The camera system according to (40), in which
the first image adjustment parameter and the second image adjustment parameter include image adjustment parameters related to levels of the first video signal and the second video signal, and a dynamic range of the first video signal is narrower than a dynamic range of the second video signal.

(42) The camera system according to (40) or (41), in which
the first image adjustment parameter and the second image adjustment parameter include image adjustment parameters related to colors of the first video signal and the second video signal.

(43) The camera system according to any one of (40) to (42), in which
the first video signal is an SDR (Standard Dynamic Range) video, and the second video signal is an HDR (High Dynamic Range) video.

(44) The camera system according to any one of (40) to (43), in which
the first image adjustment parameter includes a relative range that indicates a ratio of a gain with respect to the first video signal and a gain with respect to the second video signal.

(45) The camera system according to any one of (40) to (44), in which
the first image adjustment parameter includes color gamut information of the first video signal.

(46) The camera system according to any one of (40) to (45), in which
the first image adjustment parameter includes information for performing black level correction.

(47) The camera system according to any one of (40) to (46), in which
the first image adjustment parameter includes information related to knee correction.

(48) The camera system according to any one of (40) to (47), in which
the first image adjustment parameter includes information related to dynamic range compression.

(49) The camera system according to any one of (40) to (48), in which
the second image adjustment parameter includes OETF (Optical-Electro Transfer Function) information.

(50) The camera system according to any one of (40) to (49), in which
the second image adjustment parameter includes color gamut information of the second video signal.

(51) The camera system according to any one of (40) to (50), in which
the second image adjustment parameter includes information for performing black level correction.

(52) A video converter, including
a second processing circuit that generates, on a basis of a second image adjustment parameter included in transmission information transmitted from a camera system that generates, from a pixel signal generated by an image pickup unit that captures a subject and obtains a pixel signal thereof, a first video signal on a basis of a first image adjustment parameter, generates a second video signal on a basis of the second image adjustment parameter different from the first image adjustment parameter, and transmits transmission information obtained by adding the first adjustment parameter and the second adjustment parameter to the second video signal via a first transmission channel, a restoration pixel signal by inverse-transforming the second video signal included in the transmission information, and also carries out adjustment processing corresponding to the first video signal on the restoration signal on a basis of the first adjustment parameter included in the transmission information to generate an output video signal corresponding to the first video signal.

(53) The video converter according to (52), in which
the first image adjustment parameter and the second image adjustment parameter include image adjustment parameters related to levels of the first video signal and the second video signal, and a dynamic range of the first video signal is narrower than a dynamic range of the second video signal.

(54) The video converter according to (52) or (53), in which
the first image adjustment parameter and the second image adjustment parameter include image adjustment parameters related to colors of the first video signal and the second video signal.

(55) The video converter according to any one of (52) to (54), in which
the first video signal is an SDR (Standard Dynamic Range) video, and the second video signal is an HDR (High Dynamic Range) video.

(56) The video converter according to any one of (52) to (55), in which
the first image adjustment parameter includes a relative range that indicates a ratio of a gain with respect to the first video signal and a gain with respect to the second video signal.

(57) The video converter according to any one of (52) to (56), in which
the first image adjustment parameter includes color gamut information of the first video signal.

(58) The video converter according to any one of (52) to (57), in which
the first image adjustment parameter includes information for performing black level correction.

(59) The video converter according to any one of (52) to (58), in which
the first image adjustment parameter includes information related to knee correction.

(60) The video converter according to any one of (52) to (59), in which
the first image adjustment parameter includes information related to dynamic range compression.

(61) The video converter according to any one of (52) to (60), in which
the second image adjustment parameter includes OETF (Optical-Electro Transfer Function) information.

(62) The video converter according to any one of (52) to (61), in which
the second image adjustment parameter includes color gamut information of the second video signal.

(63) The video converter according to any one of (52) to (62), in which
the second image adjustment parameter includes information for performing black level correction.

REFERENCE SIGNS LIST 1 video system
10 camera system
11 image pickup apparatus
12 camera control unit
13 camera cable
20 video converter
30 main transmission channel
35 output transmission channel
114 CPU
121 transmission unit
122 HDR process unit
123 SDR process unit
124 CPU
201 inverse HDR process unit
202 SDR process unit
203 CPU

The invention claimed is:

1. A video system, comprising:
a camera system including:
a first processing circuit that (i) generates, from a pixel signal generated by an image pickup unit that captures a subject and obtains a pixel signal thereof, a first video signal in which one or more pixels in the pixel signal are adjusted on a basis of a first image adjustment parameter, (ii) generates, from the pixel signal generated by the image pickup unit, a second video signal in which one or more pixels in the pixel signal are adjusted on a basis of a second image adjustment parameter different from the first image adjustment parameter, and (iii) transmits transmission information obtained by adding the first image adjustment parameter and the second image adjustment parameter to the second video signal via a first transmission channel,
a video converter configured to receive the transmission information via the first transmission channel and including:
a second processing circuit that (i) generates, on a basis of the second image adjustment parameter included in the transmission information, a restoration pixel signal by inverse-transforming the second video signal included in the transmission information, and (ii) performs adjustment processing corresponding to the first video signal on the restoration pixel signal on a basis of the first image adjustment parameter included in the transmission information to generate an output video signal corresponding to the first video signal,
wherein the first video signal is an SDR (Standard Dynamic Range) video, and the second video signal is an HDR (High Dynamic Range) video.

2. The video system according to claim 1, wherein
the first image adjustment parameter and the second image adjustment parameter include image adjustment parameters related to levels of the first video signal and the second video signal, and a dynamic range of the first video signal is narrower than a dynamic range of the second video signal.

3. The video system according to claim 2, wherein
the first image adjustment parameter and the second image adjustment parameter include image adjustment parameters related to colors of the first video signal and the second video signal.

4. The video system according to claim 1, wherein
the first processing circuit and the second processing circuit are configured such that only the second video signal out of the first video signal and the second video signal is transmitted from the camera system to the video converter via a second transmission channel, and
the second processing circuit is configured to transmit an output video signal corresponding to the first video signal to a display via a third transmission channel different from the second transmission channel.

5. The video system according to claim 4, wherein
the first image adjustment parameter includes a relative range that indicates a ratio of a gain with respect to the first video signal and a gain with respect to the second video signal.

6. The video system according to claim 4, wherein
the first image adjustment parameter includes color gamut information of the first video signal.

7. The video system according to claim 4, wherein
the first image adjustment parameter includes information for performing black level correction.

8. The video system according to claim 4, wherein
the first image adjustment parameter includes information related to knee correction.

9. The video system according to claim 4, wherein
the first image adjustment parameter includes information related to dynamic range compression.

10. The video system according to claim 4, wherein
the second image adjustment parameter includes OETF (Optical-Electro Transfer Function) information.

11. The video system according to claim 4, wherein
the second image adjustment parameter includes color gamut information of the second video signal.

12. The video system according to claim 4, wherein
the second image adjustment parameter includes information for performing black level correction.

13. The video system according to claim 1, wherein the adding of the first image adjustment parameter and the second image adjustment parameter to the second video signal includes multiplexing the first image adjustment parameter and the second image adjustment parameter to the second video signal.

14. A video processing method, comprising:
generating, by a first processing circuit in a camera system, from a pixel signal generated by an image pickup unit that captures a subject and obtains a pixel signal thereof, a first video signal in which one or more pixels in the pixel signal are adjusted on a basis of a first image adjustment parameter;
generating, by the first processing circuit in the camera system, from the pixel signal generated by the image pickup unit, a second video signal in which one or more pixels in the pixel signal are adjusted on a basis of a second image adjustment parameter different from the first image adjustment parameter;
transmitting, by the first processing circuit in the camera system, transmission information obtained by adding the first image adjustment parameter and the second image adjustment parameter to the second video signal via a first transmission channel;
receiving, by a video converter, the transmission information via the first transmission channel;
generating, by a second processing circuit in the video converter, on a basis of the second image adjustment parameter included in the transmission information, a restoration pixel signal by inverse-transforming the second video signal included in the transmission information; and
performing, by the second processing circuit in the video converter, adjustment processing corresponding to the first video signal on the restoration pixel signal on a basis of the first image adjustment parameter included in the transmission information to generate an output video signal corresponding to the first video signal,
wherein the first video signal is an SDR (Standard Dynamic Range) video, and the second video signal is an HDR (High Dynamic Range) video.

15. A non-transitory computer readable medium having instructions stored therein, which when executed by a processor cause the processor to execute a method comprising:
generating, from a pixel signal generated by an image pickup unit that captures a subject and obtains a pixel signal thereof, a first video signal in which one or more pixels in the pixel signal are adjusted on a basis of a first image adjustment parameter;
generating, from the pixel signal generated by the image pickup unit, a second video signal in which one or more pixels in the pixel signal are adjusted on a basis of a second image adjustment parameter different from the first image adjustment parameter;
transmitting transmission information obtained by adding the first image adjustment parameter and the second image adjustment parameter to the second video signal via a first transmission channel;
receiving the transmission information via the first transmission channel
generating, on a basis of the second image adjustment parameter included in the transmission information, a restoration pixel signal by inverse-transforming the second video signal included in the transmission information; and
performing adjustment processing corresponding to the first video signal on the restoration pixel signal on a basis of the first image adjustment parameter included in the transmission information to generate an output video signal corresponding to the first video signal,
wherein the first video signal is an SDR (Standard Dynamic Range) video, and the second video signal is an HDR (High Dynamic Range) video.

16. A video converter, comprising
a second processing circuit that (i) generates, on a basis of a second image adjustment parameter included in transmission information transmitted from a camera system that
(a) generates, from a pixel signal generated by an image pickup unit that captures a subject and obtains a pixel signal thereof, a first video signal in which one or more pixels in the pixel signal are adjusted on a basis of a first image adjustment parameter,
(b) generates, from the pixel signal generated by the image pickup unit, a second video signal in which one or more pixels in the pixel signal are adjusted on a basis of the second image adjustment parameter different from the first image adjustment parameter, and
(c) transmits transmission information obtained by adding the first image adjustment parameter and the second image adjustment parameter to the second video signal via a first transmission channel,
a restoration pixel signal by inverse-transforming the second video signal included in the transmission information, and performs (ii) adjustment processing corresponding to the first video signal on the restoration pixel signal on a basis of the first image adjustment parameter included in the transmission information to generate an output video signal corresponding to the first video signal,
wherein the first video signal is an SDR (Standard Dynamic Range) video, and the second video signal is an HDR (High Dynamic Range) video.

* * * * *